United States Patent [19]
Wang et al.

[11] Patent Number: 5,482,796
[45] Date of Patent: Jan. 9, 1996

[54] ELECTROCHEMICAL CELL COMPRISING GAMMA MNO₂ CATHODE HAVING FILAMENTARY PROTRUSIONS

[75] Inventors: Enoch I. Wang, Attleboro; Lifun Lin, Lincoln, both of Mass.; William L. Bowden, Nashua, N.H.

[73] Assignee: Duracell Inc., Bethel, Conn.

[21] Appl. No.: 237,434

[22] Filed: May 3, 1994

Related U.S. Application Data

[62] Division of Ser. No. 122,966, Sep. 20, 1993, Pat. No. 5,348,726, which is a division of Ser. No. 952,034, Sep. 28, 1992, Pat. No. 5,277,890.

[51] Int. Cl.⁶ .................................................. H01M 4/50
[52] U.S. Cl. ........................... 429/194; 429/224; 429/206; 429/229; 423/605
[58] Field of Search ...................................... 429/224, 218, 429/229, 206; 423/605

[56] References Cited

U.S. PATENT DOCUMENTS 4,277,360  7/1981  Mellors et al. ..................... 429/224 X

*Primary Examiner*—Anthony Skapars
*Attorney, Agent, or Firm*—Ronald S. Cornell; Barry D. Josephs

[57] ABSTRACT

The invention relates to the manufacture of manganese dioxide by a chemical process. The resulting manganese dioxide product takes the form of particles characterized by filament-like protrusions jutting out from its surface. The manganese dioxide particles having such surface features can be manufactured by reacting manganese sulfate with sodium peroxodisulfate in an aqueous solution. The process can be controlled to yield high density manganese dioxide. The manganese dioxide formed in the process can be deposited directly onto the surface of electrolytic manganese dioxide (EMD). The manganese dioxide product is particularly suitable for use as a cathode active material in electrochemical cells.

15 Claims, 6 Drawing Sheets

2,030x      10 μm 199x   100μm 2,030x   10μm 2,040x   10μm 9,850x   1μm

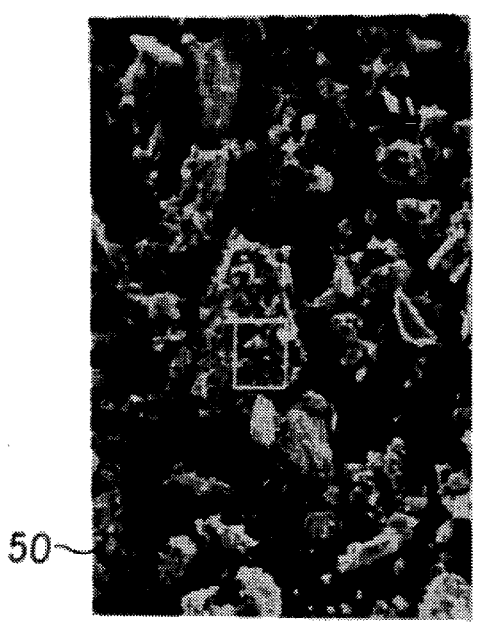
200x  FIG. 3A
2,040x  FIG. 3B
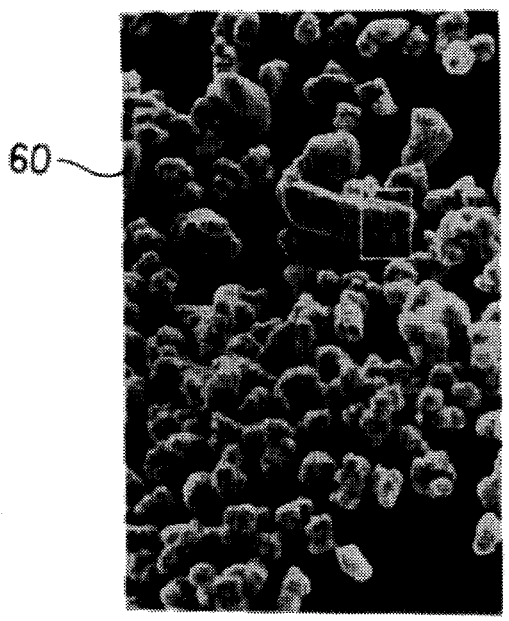
450x  FIG. 4A
4,600x  FIG. 4B

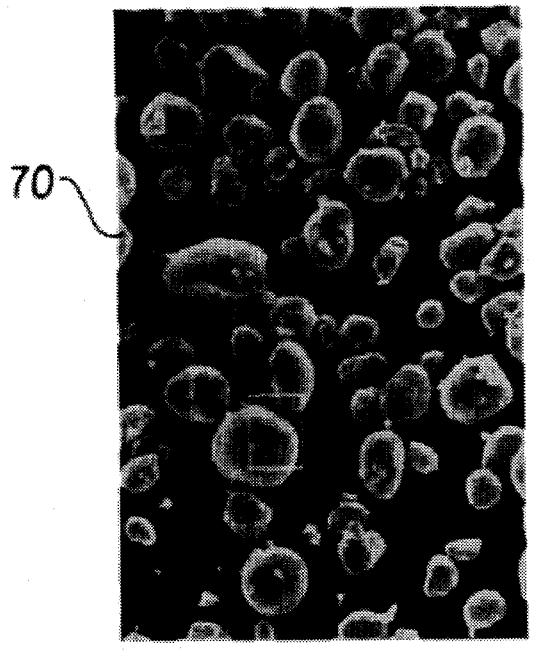
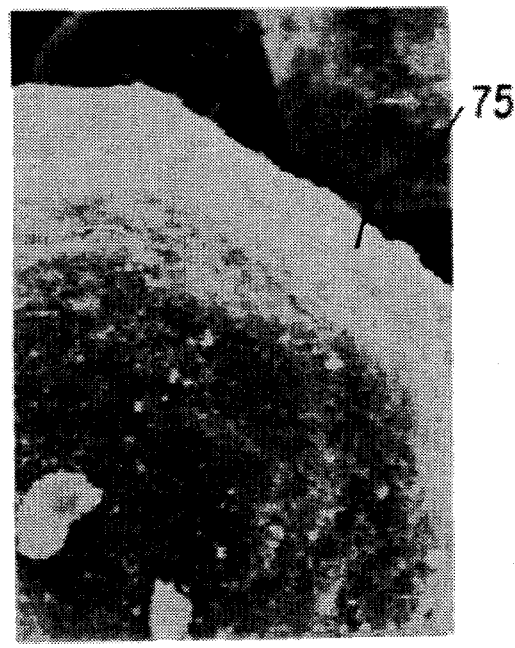
FIG. 5A
FIG. 5B

ELECTROCHEMICAL CELL COMPRISING GAMMA MNO₂ CATHODE HAVING FILAMENTARY PROTRUSIONS This application is a division of application Ser. No. 08/122,966, filed Sep. 20, 1993, now U.S. Pat. No. 5,348,726 which is a division of U.S. Ser. No. 07/952,034, filed Sep. 28, 1992, now U.S. Pat. No. 5,277,890.

The invention relates to a process for production of manganese dioxide, particularly for use as a cathode active material in electrochemical cells.

Manganese dioxide is commonly employed as a cathode active material in commercial batteries including heavy duty, alkaline and lithium cells. Battery grade manganese dioxide has been derived from naturally occurring manganese dioxide (NMD) and synthetically produced manganese dioxide. Synthetic manganese dioxide is basically divided into two categories: electrolytic manganese dioxide (EMD) and chemical manganese dioxide (CMD). NMD because of its high impurity content cannot be employed in alkaline or lithium cells.

EMD, which is typically manufactured from direct electrolysis of a bath of manganese sulfate and sulfuric acid, is a high purity, high density, gamma manganese dioxide which has been proved to be desirable for use as a cathode active material in alkaline and lithium cells. During the electrolysis process the gamma EMD is deposited directly on the anode which is typically made of titanium, lead alloy or carbon. The thickness of the $MnO_2$ deposited on the anode depends on the current density and electrolysis time. The EMD deposit is removed from the anode, crushed, ground, washed, neutralized and dried in a rotary dryer. The EMD product is generally heat treated before use in a lithium dry cell. Processes for the manufacture of EMD and its properties appear in Batteries, edited by Karl V. Kordesch, *Marcel Dekker, Inc.*, New York, Vol. 1, (1974), p. 433–488.

CMD has for many years been economically produced commercially, but such commercial chemical processes while yielding high purity $MnO_2$, do not yield densities of $MnO_2$ comparable to that of EMD. As a result EMD has become the most widely used form of battery grade $MnO_2$, particularly for alkaline and lithium cells, since in such application it has become most desirable to employ high density $MnO_2$ to increase the capacity of these cells. However, in the course of the manufacture of EMD, it is difficult to significantly alter important properties, such as surface area and activity, without adversely affecting the density. Also the compact, smooth particle structure of EMD and its low surface area can be a disadvantage, particularly, in application to lithium cells.

U.S. Pat. No. 2,956,860 (Welsh) discloses a chemical process for the manufacture of battery grade $MnO_2$ by employing the reaction mixture of $MnSO_4$ and an alkali metal chlorate, preferably $NaClO_3$. This process is known in the art as the "Sedema process" for manufacture of chemical manganese dioxide (CMD). The reaction is carried out in the presence of solid $MnO_2$ particles which act as a catalyst and nucleation site for deposition of the $MnO_2$ formed from the reaction of $MnSO_4$ and alkali metal chlorate. As the reaction proceeds, $MnO_2$ which is formed precipitates onto, and even into, the $MnO_2$ substrate particles. The resulting $MnO_2$ product from the Sedema process takes the form of smooth-surfaced spherical particles. However, the $MnO_2$ does not have a density as high as that obtained in EMD. Significantly higher densities of the $MnO_2$ product are not obtainable by controlling reaction rate with alkali metal chlorate. Also the $MnO_2$ produced from the process disclosed in this reference cannot be readily deposited on subtrates other than manganese oxides. If an alternative substrate or no substrate is employed, the $MnO_2$ product precipitates out during formation as a light fluffy product which is unacceptable as battery grade $MnO_2$.

An article by P. Strobel and J. C. Charenton (*Revue de Chimie Minerale*, Vol. 23 (1986), p.125–137, at p. 130) discloses a reaction of potassium or ammonium peroxodisulfates ($K_2S_2O_8$ or $(NH_4)_2S_2O_8$) with $MnSO_4$ to yield mixtures of hollandite (alpha $MnO_2$) and gamma $MnO_2$. The reference states, at p. 129, that only potassium and ammonium peroxodisulfates are sufficiently stable for use in the reaction.

An article by K. Yamamura et. al., ("A New Chemical Manganese Dioxide for Dry Batteries," *Progress in Batteries & Battery Materials*, Vol. 10 (1991), p. 56–75) discloses another process for manufacturing gamma $MnO_2$. The process referenced as the "CELLMAX" (CMD-U) process involves special treatment of purified crystalline $MnSO_4$ to produce an electrochemically active high density gamma $MnO_2$. The product has a surface area and particle appearance similar to electrolytic manganese dioxide (EMD), but differs in its pore size, tap density and particle size distribution. The process consists of the steps of leaching manganese ore, crystallizing, adjusting the pH, compressing and grinding. In the process the manganese sulfate solution extracted from the manganese ore is purified, crystallized under optimum conditions and roasted at very high temperature. The product $Mn_3O_4$ is oxidized to $Mn_2O_3$ by oxygen at high temperature. The $Mn_2O_3$ is subjected to acid treatment to yield gamma $MnO_2$ which in turn is compressed to yield a higher density. Although a high density gamma $MnO_2$ product is reported, the process has the disadvantage of involving a number of reaction and processing steps which require careful control and would be expensive to implement.

It would be desirable to have a practical chemical process for production of high purity battery grade manganese dioxide (CMD) which has a density comparable to electrolytic manganese dioxide (EMD).

It would be desirable to be able to have greater control over other physical characteristics, such as surface area, activity and porosity of the CMD without significantly sacrificing density.

It would be desirable to improve the performance and capacity of alkaline and lithium cells over that currently obtainable with EMD cathode active material.

The features of the product of the invention will be better appreciated with reference to the following figures:

FIG. 3A is an electron photomicrograph of EMD particles (prior art).

FIG. 3B is an electron photomicrograph of the EMD particles in FIG. 3A enlarged to show the characteristically irregular particle shape and smooth surface structure.

FIG. 4A is en electron photomicrograph of EMD particles coated with $MnO_2$ produced by the process of the invention.

FIG. 4B is an electron photomicrograph of coated EMD particles in FIG. 4A enlarged to show the filament-like surface protrusions.

FIG. 5A is an electron photomicrograph of prior art chemical manganese dioxide (CMD) particles.

FIG. 5B is an electron photomicrograph of the particles in FIG. 5A enlarged to show surface features.

Figure 1A:
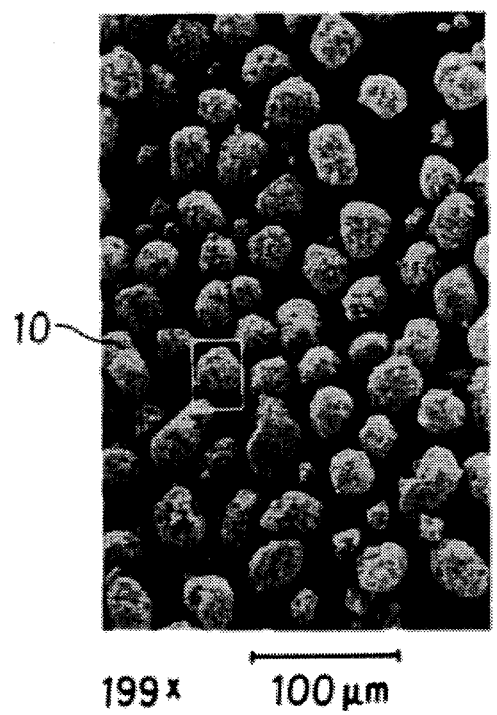
FIG. 1A is an electron photomicrograph showing the $MnO_2$ particles from the process of the invention carried out at slow rate of heating of reactants.

The present invention involves a process for production of battery grade chemical manganese dioxide (CMD). The CMD product of the invention when used in electrochemical cells, particularly alkaline and lithium cells, provides these cells with higher capacity and energy density per gram than are obtainable from the same cells employing electrolytic manganese dioxide (EMD). The process of the invention allows for greater control of properties such as density, surface area and particle size than is possible with present processes for the manufacture of conventional forms of EMD or CMD. The process of the invention therefore allows for production of high purity CMD which can be made to have properties more nearly optimal for a given electrochemical cell or battery type. In particular a high density of the $MnO_2$ product is obtainable by the process of the invention. The high density of the $MnO_2$ product is comparable to that obtained from electrolytic manganese dioxide (EMD), yet the surface area of each $MnO_2$ particle is greater than that obtained from conventional EMD and CMD processes. The high useful surface area of each particle allows for better performance, particularly in lithium cells containing $MnO_2$. By "useful" surface area we refer to the surface area which is accessible to the electrolyte.

The process of the invention for production of battery grade manganese dioxide is carried out principally by reacting an aqueous solution of manganese sulfate with sodium peroxodisulfate.

The reaction may be represented as follows:

$$MnSO_4 + Na_2S_2O_8 + 2H_2O = MnO_2 + Na_2SO_4 + 2H_2SO_4 \quad (I)$$

When an aqueous solution of manganese sulfate ($MnSO_4$) is reacted with sodium peroxodisulfate ($Na_2S_2O_8$), a gamma crystal structure of $MnO_2$ is directly obtainable as a reaction product in the form of a precipitate. The $MnO_2$ precipitate tends to form spherical particles having filament-like protrusions emanating from each particle surface. The filament-like protrusions are crystalline and appear as filaments, hairs, fibers or needles which radiate outwardly (typically straight out) from the surface of each $MnO_2$ particle and are uniformly distributed over the particle surface. The term "filament-like" as used herein shall be construed as including thin, elongated, protruding structures such as but not limited to filaments, hairs, needles and fibrous structures. They have an elongated backbone or spine structure along a major portion of their length and appear to be uniformly and densely distributed over the particle surface. The "filament-like" protrusions are characterized by a length to width ratio between about 2:1 and 20:1, typically between about 3:1 and 10:1, wherein the width and length refer to those portions of the protrusions which are visible from the particle surface. The average length of the "filament-like" protrusions is typically between 0.3 to 1 micron and the average width is typically between 0.1 to 0.3 micron. These dimensions are measurable at a magnification of about 40,000 times actual size. The "filament-like" protrusions result in high surface area of the $MnO_2$ particle. The $MnO_2$ particles of the invention as above described may typically be referenced as P-CMD (a new name) in several of the figures.

Unlike the well known Sedema process as disclosed in U.S. Pat. No. 2,956,860 (above referenced), the present invention permits the average particle size and density of the $MnO_2$ product to be altered by regulating the rate of the above reaction (I). This can be accomplished by simply controlling the amount or rate of heat supplied to the reaction. Unlike the Sedema process the present reaction does not require a catalytic $MnO_2$ substrate for receiving the $MnO_2$ product. In fact no catalyst is required and the $MnO_2$ product forms into dense, discrete particles without the need of a substrate material. However, it has been discovered that the reaction mixture can be seeded with almost any nonreactive solid material including metals and such material will act as a substrate for the $MnO_2$ product. That is, the $MnO_2$ reaction product will precipitate directly on the solid material.

It has been discovered that the above reaction mixture can be seeded with particles of electrolytic manganese dioxide (EMD) and the $MnO_2$ reaction product will deposit directly on the EMD. This results in a very high density hybrid gamma $MnO_2$ whose outer surface comprises an $MnO_2$ coating having filament-like protrusions and high surface area, while the overall particle shape and interior structure is that characteristic of EMD. This hybrid form of $MnO_2$ may be used as cathode active material in conventional electrochemical cells, particularly alkaline or lithium cells. It is especially attractive for use in lithium cells, since the exposure of the EMD particles to $H_2SO_4$ during the reaction of the invention, leaches out small amounts of sodium that is trapped within the EMD particles. This reduces the amount of sodium impurity in the $MnO_2$ product, which is particularly advantageous if it is to be used as cathode active material in lithium cells. It has also been discovered that the reaction mixture can be advantageously seeded with graphite or carbon black particles. In such case the $MnO_2$ reaction product will deposit directly onto the surface of these particles to form a hybrid particulate material which may be used as cathode active material in conventional electrochemical cells, particularly alkaline or lithium cells.

The above reaction (I) may typically be carried out in a temperature range between about 30° and 100° C., preferably between 70° and 90° C. The reaction (I) is preferably carried out in a temperature range between about 70° C. and 80° C. when the intended use of the $MnO_2$ product is as a cathode active material in an alkaline cell, and between about 80° and 90° C. when the intended use is as a cathode active material in a lithium cell. (For end application of the $MnO_2$ product to alkaline cells it is preferable to keep the final temperature below 85° C. in order to obtain a gamma $MnO_2$ product with higher running voltage and capacity than EMD.) After the reaction is complete, the $MnO_2$ precipitate is collected and rinsed with distilled water until it has a pH of 7. It may then be dried at room temperature if its intended use is as a cathode active material in an alkaline cell. Alternatively, it may be dried at elevated temperature for more thorough drying, if its intended use is as cathode active material in a lithium cell. The resulting dry gamma $MnO_2$ has a high purity and low sodium content of less than about 500 ppm. The dry $MnO_2$ product contains at least 95% gamma $MnO_2$ in particulate form. (No other crystalline forms of $MnO_2$ have been detected in the dry $MnO_2$ product of the invention, but 95% is the limit of resolution of the x-ray diffraction analysis employed for $MnO_2$.) Every $MnO_2$ particle made by the process of the invention, when observed at a magnification between 200 and 9850 times actual size, typically between 200 and 2000 times actual size, appears to have filament-like protrusions radiating outwardly from the particle surface and these protrusions appear to be uniformly distributed around the particle surface. The gamma $MnO_2$ so produced may then be heat treated in conventional manner to convert it to a gamma-beta variety, if desired. This treatment is preferred if the end use of the $MnO_2$ is as cathode active material in lithium cells. The heat treatment is well known, a suitable heat treatment process being disclosed in U.S. Pat. No. 4,921,689.

The gamma $MnO_2$ product of the invention can be compacted and used as cathode active material in conventional $Zn/MnO_2$ alkaline cells or $Li/MnO_2$ lithium cells. It results in a cell having increased capacity and energy density per gram than obtained with EMD cathode active material for the same cell. The gamma $MnO_2$ can also be used as a catalyst in zinc/air cells.

It has been determined that various properties of the $MnO_2$ product can be altered and controlled by controlling the rate at which the reaction mixture is heated. In general a denser $MnO_2$ product is obtained if the reaction is carried out at a slower rate, e.g., if heat is supplied to the reaction at a slower rate. In a slower reaction individual particles of $MnO_2$ have time to grow to form larger more compact particles. In a faster reaction, e.g. produced by faster heating of the reaction mixture, the individual particles of the $MnO_2$ product do not have sufficient time to grow to form larger particles. Therefore the individual particles are smaller and less compact. They have a fluffier appearance and lower average density than particles obtained from a slower reaction.

A sufficiently slow reaction rate to provide an $MnO_2$ product bulk density of about 15 to 32 $g/in^3$ (0.9 and 2 $g/cm^3$) SAD (Scott Apparent Density) is obtained if the aqueous reaction mixture of $MnSO_4$ and $Na_2S_2O_8$ is maintained at an initial temperature of about 50° C. for about 18 hours and then slowly increased at nearly constant rate for between about 5 and 10 hours until a final temperature of between about 70° to 90° C. is obtained. The reaction mix may then be left to stand for about 1 hour at this final reaction temperature, so obtain a maximum yield, typically about 70% of the stoichiometric amount of $MnSO_4$ converted to $MnO_2$. In this manner battery grade $MnO_2$ product can be obtained having densities comparable to or even higher than the density of electrolytic manganese dioxide (EMD) which typically is at a level of about 25 to 28 $g/in^3$ (1.5 to 1.7 $g/cm^3$) SAD (Scott Apparent Density). In general a bulk density of the $MnO_2$ product between about 15 and 32 $g/in^3$ (0.9 and 2 $g/cm^3$) can be achieved by heating the aqueous solution of $MnSO_4$ and $Na_2S_2O_8$ from an initial temperature between about 40° C. and 70° C. for a period during reaction at an average rate of less than about 7° C. per hour for at least 5 hours, typically between about 1° C. per hour and 7° C. per hour for at least 5 hours.

A sufficiently fast reaction rate to achieve an $MnO_2$ product bulk density of between about 8 to 15 $g/cm^3$ (0.5 to 0.9 $g/cm^3$) (Scott Apparent Density) is obtained if the aqueous reaction mixture of $MnSO_4$ and $Na_2S_2O_8$ is heated at about constant rate from room temperature so that a final temperature of between 70° and 90° C. is achieved in about one to two hours. The reaction mixture may be left to stand for about one hour at this final temperature, to obtain a maximum yield, typically about 70% of the stoichiometric amount of manganese in $MnSO_4$ converted to $MnO_2$. In general a bulk density of the $MnO_2$ product between about 8 $g/in^3$ and 15 $g/in^3$ (0.5 and 0.9 $g/cm^3$) can be achieved by heating the aqueous solution of $MnSO_4$ and $Na_2S_2O_8$ from an initial temperature between about 30° C. and 100° C. for a period during reaction at an average rate greater than 7° C. per hour for less than about 5 hours, typically between about 7° C. and 20° C. per hour for less than about 5 hours.

It has been determined that the stoichiometric yield of $MnO_2$ can be dramatically increased to about 95% by slowly adding a suitable alkaline base slowly to the reaction mixture. As the reaction proceeds the base reacts with the $H_2SO_4$ as it forms, thereby improving the reaction kinetics and ultimate yield of $MnO_2$. A preferred base is $Li_2CO_3$. Alternative bases can be employed to react with the $H_2SO_4$ to produce the same increase in yield of $MnO_2$. Such compounds include $Na_2CO_3$, LiOH, NaOH and MgO. For ultimate use of the $MnO_2$ product in lithium cells it would be preferred to add compounds such as $Li_2CO_3$ and LiOH to the reaction mixture to increase yield. For ultimate use of the $MnO_2$ product in alkaline cells it would be preferred to add $Na_2CO_3$ or NaOH to the reaction mixture. If such compounds are added, they should be added slowly to the reaction mixture to prevent the pH of the mixture from abruptly increasing to a pH greater than about 3.

The $MnO_2$ reaction product of the invention takes the form of descrete particles having a spherical shape and gamma crystalline structure. The particle size of the $MnO_2$ reaction product can also be controlled by varying the rate at which the reaction mixture is heated. If the reaction mixture is heated at a constant rate then the $MnO_2$ particle size distribution will be uniform, that is, there will not be much variance in the diameter of individual $MnO_2$ particles. If the reaction mixture is slowly heated at constant rate, e.g., of between about 1° C. and 7° C. for at least 5 hours, the $MnO_2$ product will take the form of relatively large uniform spherical particles as above mentioned. If the reaction mixture is rapidly heated at a fast constant rate, e.g., between about 7° C. per hour and 20° C. per hour for less than about 5 hours, the $MnO_2$ product will tend to take the form of relatively small spherical particles.

If the reaction mixture is initially heated at a slow constant rate and later at a fast constant rate, the reaction product will contain a distribution of both large and small $MnO_2$ particles. While the overall shape of the individual $MnO_2$ particles produced is spherical, the surface features of each particle is characterized by filament-like (e.g. hair-like)

microscopic protrusions distributed uniformly over the entire particle surface. Such filament-like surface structure results in $MnO_2$ particles having a useful surface area which can be greater than that achieved with EMD, but yet the bulk density is comparable to that of EMD. This is a benefit, particularly in lithium cells, because better performance and capacity is obtained when the useful surface area is increased over that of EMD. The filament-like protrusions are visible in electron photomicrographs taken at magnifications of between about 200 and 2,000 times actual size.

The following examples illustrate the method of preparation of battery grade $MnO_2$ by the the process of the invention. All parts are parts by weight unless specified otherwise.

EXAMPLE 1

High density gamma $MnO_2$ is prepared by the process of the invention as follows:

120 g of $MnSO_4$ $H_2O$ is dissolved in 1800 ml of distilled water. Then, stoichiometric amount of $Na_2S_2O_8$ (169 g) is added to the clear pinkish solution to form a reactant solution. While stirring, the solution is heated in about 2 hours from room temperature (20° C.) to 50° C. and is maintained at a temperature of 50° C. overnight (about 18 hrs) while continually stirring. This enhances the nucleation process. The reaction proceeds according to reaction (I) above referenced. The clear pinkish solution slowly turns brown and then eventually turns a black color as more $MnO_2$ is precipitated. After the 18 hour period the solution is then heated from about 50° C. at a constant rate of about 25° C. per hour for about 1 hour to a temperature of about 75° C. and is maintained at 75° C. for about 3 hours. The solution is then heated at constant rate of about 10° C. per hour for about 1 hour to a temperature of 85° C. and maintained at 85° C. for 1 hour. The solution is again heated at a constant rate 30° C. per hour for about ½ hour to a temperature of about 100° C. and maintained at 100° C. for about 1½ hours at which time the run is ended. The pH of the solution at the end of the run is less than 0.5. The solution is then cooled to room temperature (20° C.) in about one hour. The solution is filtered and the solid $MnO_2$ is continually rinsed with distilled water until the filtrate stream has a neutral pH of about 7. The resulting black powder is dried at 100° C. to drive off surface water. The overall yield of $MnO_2$ is 41 g or 67% of theoretical yield.

Figure 1B:
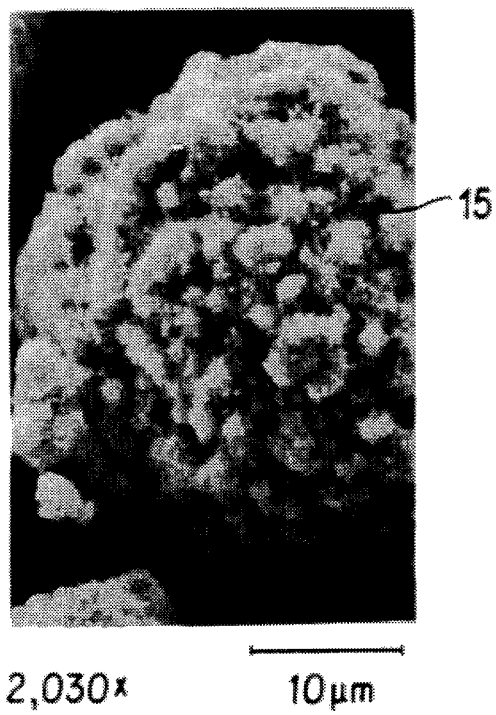
FIG. 1B is an electron photomicrograph of the particles in FIG. 1A enlarged to show the filament-like surface protrusions.

The resulting product is battery grade $MnO_2$ at least 95% of which is verified by x-ray diffraction to be of the gamma crystalline structure. (No other type $MnO_2$ crystalline structure was detected, the 95% threshold being the limit of resolution of the x-ray diffraction analysis.) The $MnO_2$ product has a high bulk density of about 23 g/in$^3$ (1.4 g/cm$^3$) SAD (Scott Apparent Density). An electron photomicrograph representative of this $MnO_2$ product is shown in FIGS. 1A and 1B. The uniform spherical structure of the $MnO_2$ particles (e.g. particle 10) is shown in FIG. 1A taken at 199× magnification. The filament-like (e.g. hair-like) protrusions 15 emanating from the surface of each spherical particle are clearly visible in FIG. 1B, which shows an individual particle at 2,030× magnification. By comparison the electron photomicrographs of the commercial battery grade CMD (WSLi) particles are shown in FIGS. 5A and 5B, which are taken at 202× and 2060× magnification, respectively. (The WSLi brand of CMD is available from Sedema, a division of Sadacem, S.A., Terte, Belgium.) It is clear from FIGS. 5A and 5B that representative particles 70 do not exhibit filament-like protrusions characteristic of the $MnO_2$ product of the invention (FIGS. 1A and 1B).

EXAMPLE 2

Figure 2A:
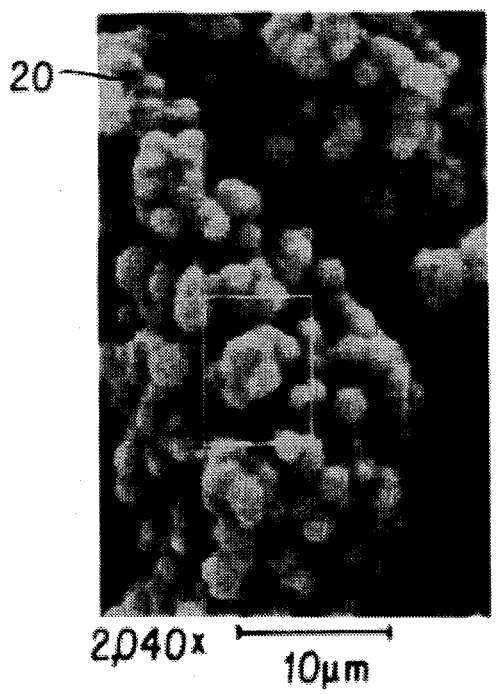
FIG. 2A is an electron photomicrograph showing smaller sized $MnO_2$ particles from the process of the invention carried out at fast rate of heating of the reactants.
Figure 2B:
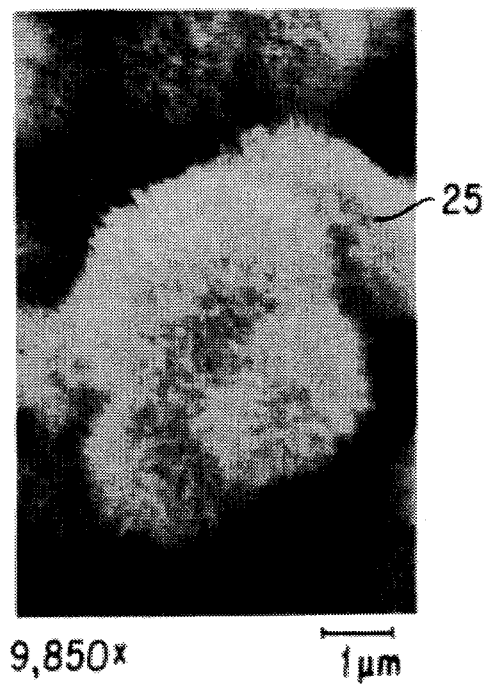
FIG. 2B is an electron photomicrograph of the particles in FIG. 2A enlarged 9850× to show the filament-like surface protrusions.

Lower density gamma $MnO_2$ is prepared by the process of the invention as follows:

The gamma $MnO_2$ product of the invention is made in a similar manner as described in example 1, except that rate of heating is faster leading to smaller size and less dense particles. Specifically, the same method of preparation and conditions as in example 1 are employed except the reactant solution is heated from 50° C. to 100° C. at rate of about about 17° C. per hour for a period of less than 5 hours, namely about 3 hours. FIGS. 2A and 2B are electron photomicrographs of the resulting $MnO_2$ product. The product sample represented in FIGS. 2A and 2B had a bulk density of about 8.7 g/in$^3$ (0.53 g/cm$^3$) (Scott Apparent Density) and is at least 95% gamma $MnO_2$.

The filament-like (e.g. hair-like) surface protrusions 20 and 25 of the individual $MnO_2$ particles may be seen in FIGS. 2A and 2B, respectively. The $MnO_2$ particles as described in this example may be used as cathode active material in electrochemical cells, particularly alkaline and lithium cells. If intended for use in lithium cells the gamma $MnO_2$ may be heated at a temperature between about 300°–400° C., typically for about 6 hours at 350° C. or 32 hours at 300° C. to convert the gamma $MnO_2$ to gamma-beta crystalline structure and to evaporate any residual moisture entrapped within the $MnO_2$ particles.

EXAMPLE 3

The $MnO_2$ is produced in a manner similar to that described in Example 1 except that $Li_2CO_3$ is added to the reaction mixture in order to increase the yield of $MnO_2$. 583 g of $MnSO_4$ $H_2O$ is first dissolved in 8 liter of distilled water in a 12 liter round bottom flask. Then stoichiometric amount of $Na_2S_2O_8$ (822 g) is added to the slightly pinkish solution. The solution is heated at a constant slow rate for 6 hours from room temperature (20° C.) to 55° C. Then 23 g of $Li_2CO_3$ is then slowly added and the solution is maintained at a temperature of about 55° C. for 18 hours while continually mixing. An additional 69 g of $Li_2CO_3$ is added after the 18 hour period and the solution is heated at a constant rate of about 6° C. per hour for about 2.5 hours up to a temperature of 70° C. Another 36 g of $Li_2CO_3$ is then added and the solution is heated at a constant rate of about 5° C. per hour for 2 hours up to a temperature of about 80° C. The solution is then heated at a reduced constant rate of about 3.3° C. per hour for 3 more hours up to a temperature of 90° C. The solution temperature is held for about 18 hours and then cooled in about 1 hour to room temperature (20° C.). The $MnO_2$ product is recovered and dried in the manner described in example 1. The yield of $MnO_2$ is 270 g or 90% of the theoretical yield. At least 95% of the $MnO_2$ product is verified by x-ray diffraction to be gamma $MnO_2$. The bulk density of the $MnO_2$ product is measured as 20 g/in$^3$ (1.2 g/cm$^3$) (Scott Apparent Density). This $MnO_2$ product can be heat treated as in Example 1 whereupon it becomes particularly suitable for use as a cathode active material in lithium cells.

EXAMPLE 4

This example demonstrates the use of EMD particles as a substrate for the precipitation of $MnO_2$ in accordance with the invention.

120 g of $MnSO_4 \cdot H_2O$ is dissolved in 1.6 liter of distilled water in a 2 liter beaker by stirring. 120 g of $Na_2S_2O_8$ and 20 g of EMD (from Kerr-McGee) are then added to the slightly pinkish clear solution.

The heating regimen is as follows. The whole mixture is first heated from room temperature (20° C.) to 55° C. in about 2 hours and held at this temperature for 18 hours while continually mixing. The whole mixture is then heated slowly at constant rate for about 5.5 hours to a temperature of 75° C. Then the whole mixture is heated for another hour at constant rate to a temperature of 100° C. Thereupon the mixture is cooled to room temperature (20° C.) in about 1 hour.

The hybrid $MnO_2$ is rinsed with distilled water until neutral. Then it is filtered and dried at 100° C. to remove surface water. The total yield of hybrid $MnO_2$ product is 60 g and its bulk density is 24 g/in$^3$ (1.5 g/cm$^3$) (Scott Apparent Density). The hybrid $MnO_2$ product contains about 67 wt % of the deposited gamma $MnO_2$ and 33 wt % EMD.

The $MnO_2$ product consists of gamma $MnO_2$ deposited uniformly over the surface of the individual EMD particles to form a hybrid $MnO_2$ product. Each particle of the hybrid $MnO_2$ product retains the overall irregular shape of the EMD particle, but exhibits a surface formed of uniformly distributed filament-like protrusions characteristic of the gamma $MnO_2$ made in accordance with the process of the invention. Representative electron photomicrographs of the hybrid $MnO_2$ particles are shown in FIGS. 4A and 4B. By way of comparison FIGS. 3A and 3B are electron photomicrographs of the EMD particles. These figures clearly show the irregular shape and smooth surface of each EMD particle. FIG. 4A shows the overall shape of each hybrid particle, e.g., particle 60 (at a magnification of 450 times actual), as resembling the shape of the EMD particles, e.g. particle 50 (FIG. 3A). However, as may be seen from FIG. 4B, the surface features of each hybrid $MnO_2$ particle exhibit filament-like protrusions, e.g. protrusions 65, emanating from and uniformly covering the surface of each hybrid particle. This is the result of the deposition of the gamma $MnO_2$ of the present process onto the EMD particles. An advantage of this hybrid is that it has higher surface area than EMD, but yet also has high bulk density. It is also cheaper to manufacture than an equivalent weight of gamma $MnO_2$ produced by the process of the invention. The hybrid $MnO_2$ so produced can be used as cathode active material in electrochemical cells. If heat treated before application, e.g. as in Example 1, it can be employed as cathode active material in lithium cells.

EXAMPLE 5

This example demonstrates the preparation of high density gamma $MnO_2$ specifically for use as cathode active material in alkaline cells.

583 g of $MnSO_4 \cdot H_2O$ are dissolved in 8000 ml of distilled water contained in a 12 liter round bottom flask. Then, stoichiometric amount of $Na_2S_2O_8$ (822 g) is added to the clear pinkish solution. The solution is heated from room temperature (20° C.) to 50° C. in about 2 hours. The solution is then slowly heated from 50° C. to 65° C. over a period of eight hours and maintained at a temperature of 65° C. for 18 hours while continually stirring. The reaction proceeds according to reaction (I) above referenced. The clear pinkish solution slowly turns to a brown and then eventually black color as more $MnO_2$ is deposited. Following the 18 hour period the solution is then finally heated slowly at about a constant rate from 65° C. to 80° C. over a period of eight hours. The solution is cooled to room temperature (20° C.) in about 1 hour. The gamma $MnO_2$ product is recovered by filtering the final solution and continually rinsing with distilled water until the filtrate has a neutral pH of about 7. The resulting black powder is dried as in the preceeding examples to drive off surface water. The resulting product is battery grade $MnO_2$ which is verified by x-ray diffraction to be of the gamma crystalline structure. The $MnO_2$ product has a high bulk density of about 28 g/in$^3$ (1.7 g/cm$^3$) SAD (Scott Apparent Density). (For usage in an alkaline cell, the $MnO_2$ product of the invention preferably should exhibit a high SAD, preferably of at least 25 g/in$^3$ (1.5 g/cm$^3$) which in turn has been found to result in a high load voltage and capacity.)

PERFORMANCE TESTS

EXAMPLE 6

Figure 6A:
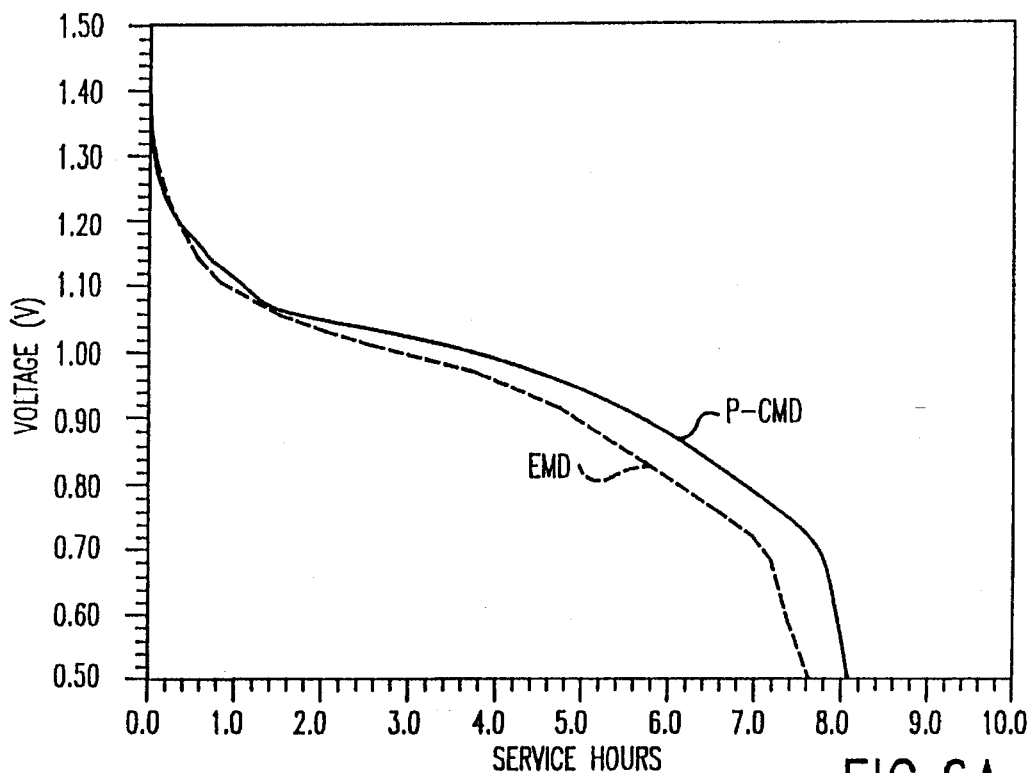
FIG. 6A is a graphical plot of the voltage profile (voltage versus service hours) in an alkaline AA cell at 3.9 ohm constant load, comparing performance of the $MnO_2$ of the invention (P-CMD) with conventional EMD.

The $MnO_2$ product of the invention (P-CMD) is evaluated for its electrochemical performance in an AA cell. The performance of the $MnO_2$ product (P-CMD) as cathode active material in an alkaline AA cell is shown in FIGS. 6A. The performance of the $MnO_2$ product (P-CMD) as shown in this figure is compared to conventional EMD cathode active material (from Kerr-McGee Corp.) for the same type cell. It is clear from this figure that the $MnO_2$ product (P-CMD) exhibits a slightly higher running voltage and a greater capacity (amp-hrs) than obtainable for the same cell using EMD as cathode material. The $MnO_2$ product (P-CMD) is believed to be the first CMD that exhibits better performance in alkaline cells than EMD.

EXAMPLE 7

The $MnO_2$ product of the invention is evaluated for its performance in a flooded alkaline cell. This cell utilizes conventional zinc anode and KOH electrolyte and paper separator as employed in commercial Duracell alkaline cells. The flooded cell is in the shape of a disk of same diameter as that of a Duracell AA cell. The flooded cell is cathode limited, thus excess electrolyte (1.5 g) and excess zinc (5.6 g) are used in order to evaluate the intrinsic performance of the $MnO_2$ product (0.17 g) as cathode active material. The flooded cell is fabricated by first pouring a mixture of $MnO_2$ powder, graphite and KOH (60 wt % $MnO_2$, 34.5 wt % graphite and 5.5 wt % KOH) into the bottom of an empty AA size nickel coated stainless steel can which is open at one end and closed at the other. The $MnO_2$ powder is then compacted into a disk-like shape. A paper separator is then placed on top of the $MnO_2$ disk. The separator is then filled with the KOH electrolyte and the remaining volume of the can then filled with a zinc slurry. The open end of the can is covered with a stainless steep cap. The cap is in electrical contact with the zinc slurry through a nail penetrating from the cap into the slurry.

Figure 6B:
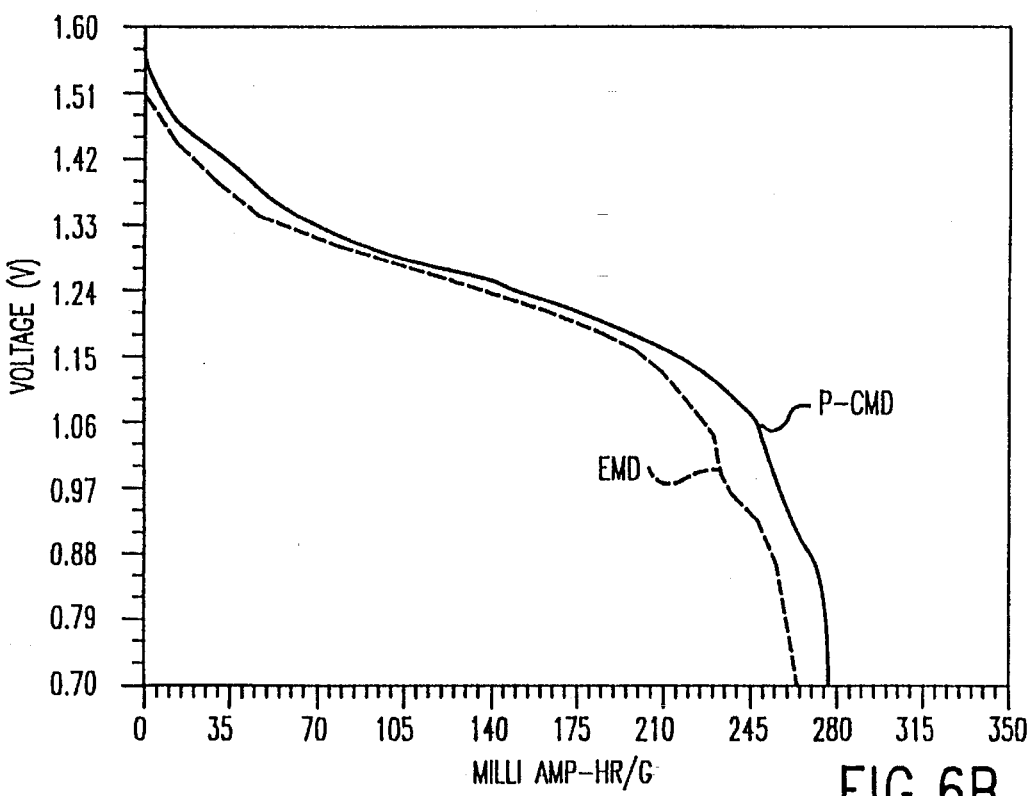
FIG. 6B is a graphical plot of the voltage profile (voltage versus milli amp-hour per gram $MnO_2$) in a flooded alkaline cell at 0.3 milli-amp/$cm^2$ current drain rate, comparing performance of the $MnO_2$ product of the invention (P-CMD) with conventional EMD.

Two flooded cells are made as above described, but with one containing the $MnO_2$ product of the invention (P-CMD) as cathode material and the other containing conventional battery grade EMD (from Kerr-McGee Co.) as cathode material. The performance of the two cells are compared at a current drain rate of 0.3 milli-amp/cm$^2$ and the results shown in FIG. 6B. It may be seen from the voltage profiles reported in FIG. 6B that the performance of the flooded alkaline cell utilizing the $MnO_2$ product (P-CMD) is superior to that employing the EMD.

EXAMPLE 8

The gamma $MnO_2$ product obtained by the process described in example 3 is heated at about 350° C. for about six hours to convert the gamma $MnO_2$ to a gamma-beta phase. A coin shaped cell is fabricated utilizing a cathode active material prepared by mixing $MnO_2$, graphite and polytetrafluouroethylene binder in a weight ratio of 6:3:1. The cathode mixture is compacted by press molding it onto a stainless steel mesh and spot welding it onto a steel case which forms the positive electrode. The positive electrode containing the cathode material is immersed in a conventional lithium salt electrolyte composed of lithium hexafluorophosphate ($LiPF_6$) dissolved in propylene carbonate and dimethoxyethane organic solvents. Other conventional lithium salt electrolytes such as lithium perchlorate and organic solvents such as propylene carbonate, ethylene carbonate, dimethoxyethane and mixtures thereof can also be used. Excess amount of lithium is employed for the negative electrode. The negative electrode is formed by press molding a lithium foil onto a stainless steel mesh which in turn is spot welded to a steel case. A separator composed of a non-woven cloth is applied over the lithium foil. The positive electrode is assembled over the negative electrode with the separator therebetween. The assembly is performed in an argon filled dry chamber. The entire assembly is filled with the liquid electrolyte and then sealed by crimping the edge of the cell.

Figure 7A:
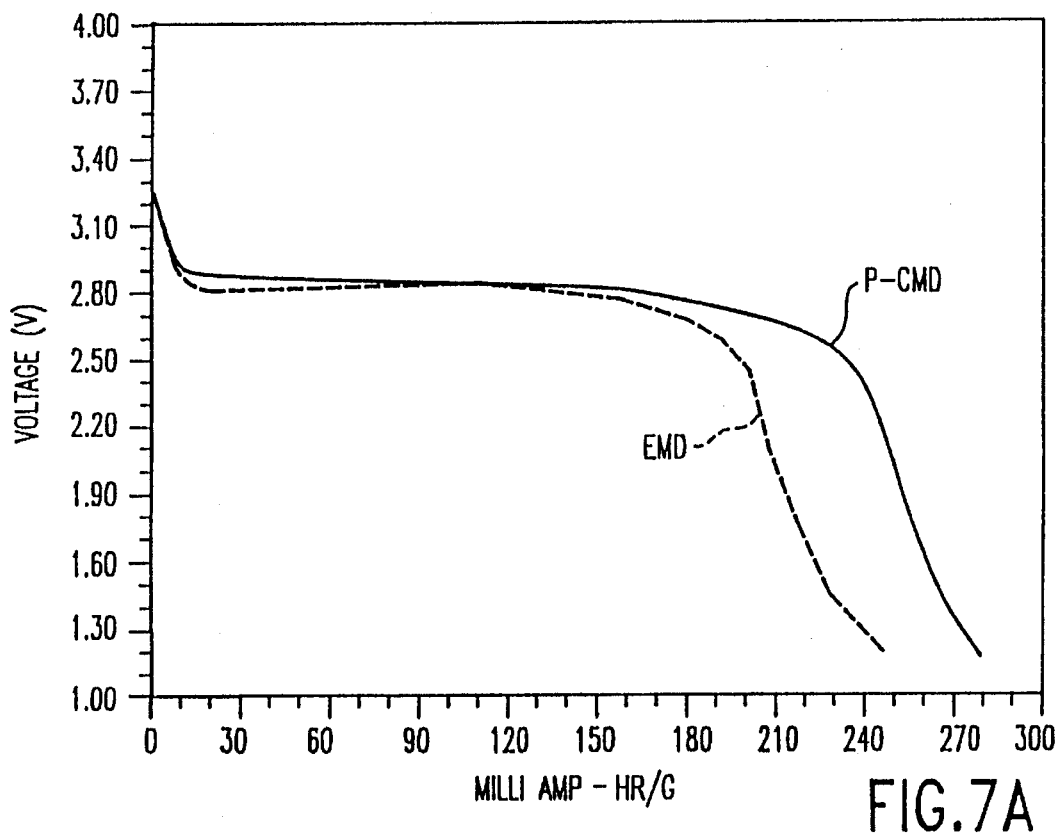
FIG. 7A is a graphical plot of the voltage profile (voltage versus milli amp-hour per gram $MnO_2$) in a lithium cell at 0.17 milli-amp/$cm^2$ current drain rate comparing performance of the $MnO_2$ product of the invention (P-CMD) with conventional EMD.
Figure 7B:
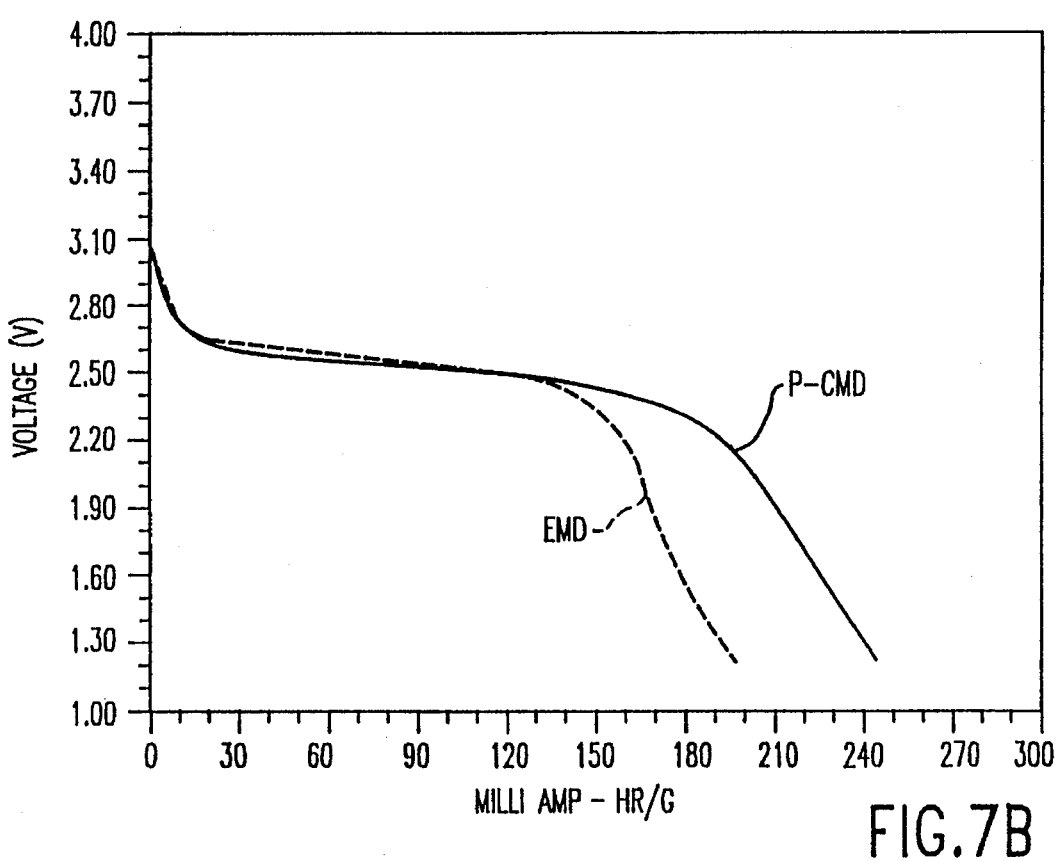
FIG. 7B is a graphical plot of the voltage profile (voltage versus milli amp-hour per gram $MnO_2$) in a lithium cell at 1.0 milli-amp/$cm^2$ current drain rate, comparing performance of the $MnO_2$ product of the invention (P-CMD) with conventional EMD.

Two lithium coin-shaped cells made in the above manner are discharged down to 1.2 volts with current drain rates of 0.17 and 1 milliamp/cm², respectively. The resulting voltage profiles for these cells utilizing the $MnO_2$ cathode active material of the invention (P-CMD) are shown in FIGS. 7A and 7B for drain rates at 0.17 and 1 milliamp/cm², respectively. Each figure also shows comparative voltage profiles obtained for a like cell at same current drain rates, but instead using conventional EMD cathode active material (from Kerr-McGee Corp.) which is heat treated and press molded for use in the lithium cell. As may be seen from the figures the $MnO_2$ cathode active material of the invention (P-CMD) exhibits a greater capacity (milliamp-hr/g) than the EMD. The capacity improvement of the $MnO_2$ product of the invention over that of EMD for the current drain rates of 0.17 and 1 milliamp/cm² are about 20% and 28%, respectively. The $MnO_2$ product of the invention, thus, shows performance improvement over EMD in lithium cells, particularly at the higher current rates.

EXAMPLE 9

The same tests are performed as in example 8 using the coin-shaped lithium cells assembled, as above described, except that the performance of the $MnO_2$ product of the invention (P-CMD) is compared against that of CMD. The CMD chosen is that commercially available for specific use in lithium cells, namely, that sold under the trade designation WSLi chemical manganese dioxide (CMD) for Sedema, division of Sadacem, S.A., Tertre, Belgium.

Figure 8A:
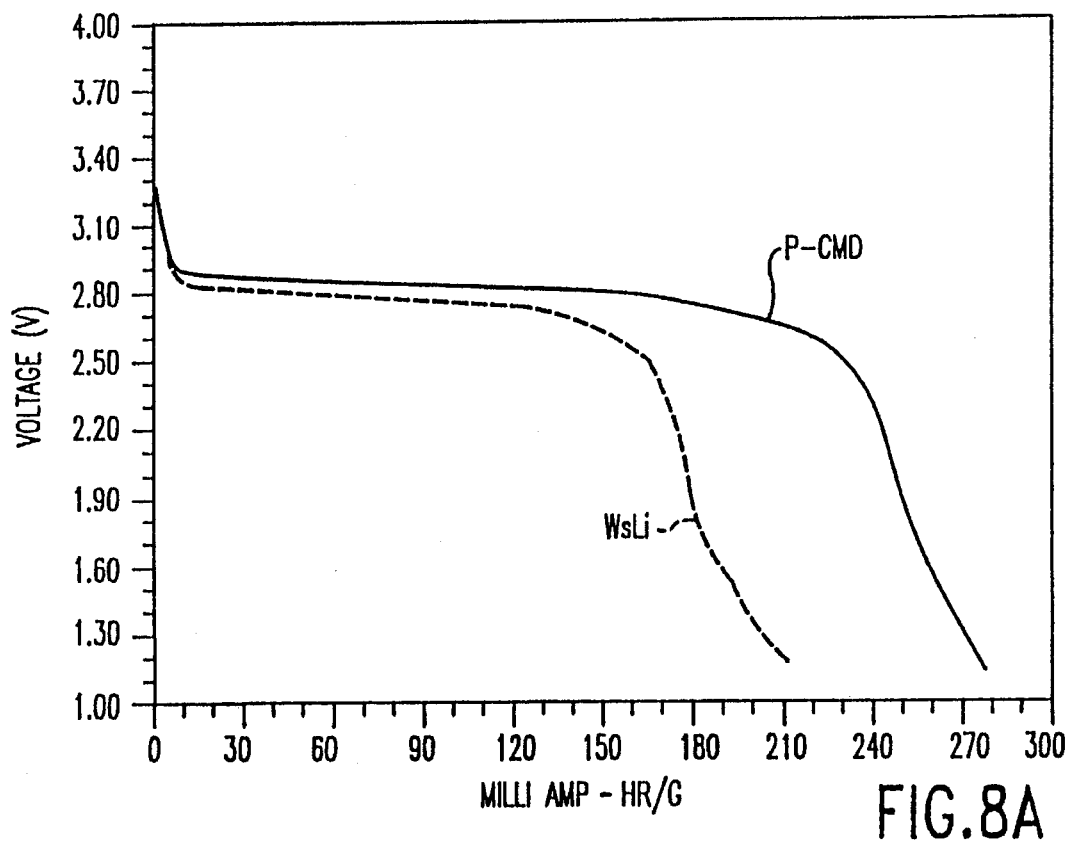
FIG. 8A is a graphical plot of the voltage profile (voltage versus milli amp-hour per gram $MnO_2$) in a lithium cell at 0.17 milli-amp/$cm^2$ current drain rate, comparing performance of the $MnO_2$ product of the invention (P-CMD) with conventional CMD (WSLi).
Figure 8B:
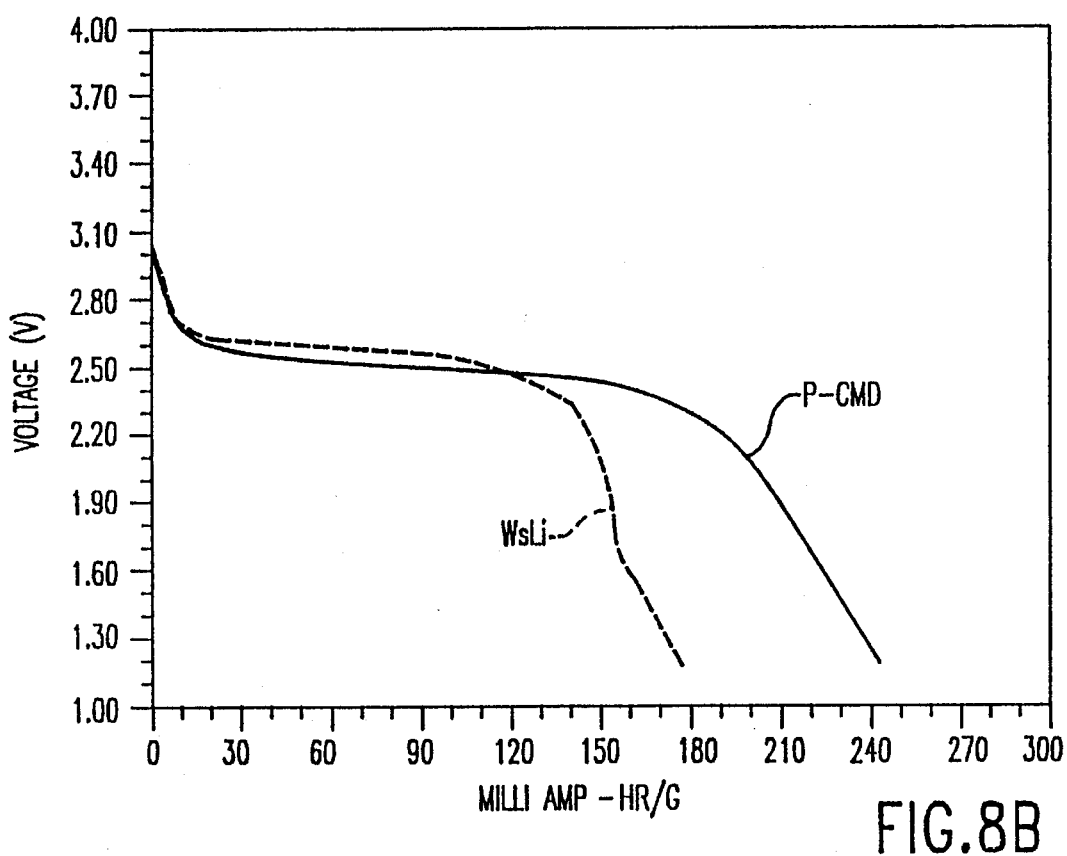
FIG. 8B is a graphical plot of the voltage profile (voltage versus milli amp-hour per gram $MnO_2$) in a lithium cell at 1.0 milli-amp/$cm^2$ current drain rate, comparing performance of the $MnO_2$ product of the invention (P-CMD) with conventional CMD (WSLi).

Two coin-shaped lithium cells are prepared as in example 8 but with one cell containing Sedema WSLi chemical manganese dioxide and the other containing the $MnO_2$ product of the invention (P-CMD) as the cathode active material. The voltage profiles for these two cells are given at current drain rates of 0.17 and 1.0 milliamp/cm² as illustrated in FIGS. 8A and 8B, respectively. As may be seen from these figures, the $MnO_2$ product of the invention (P-CMD) has significantly greater capacity (milliamp/g) than the Sedema CMD (WSLi) at the current drain rates tested.

Although the present invention has been described with reference to specific embodiments, it should be recognized that variations are possible within the scope of the invention. Therefore, the invention is not intended to be limited to specific embodiments, but rather is defined by the claims and equivalents thereof.

What is claimed is:

1. An electrochemical cell having $MnO_2$ cathode active material in said cell, wherein the $MnO_2$ material comprises particles the surfaces of which comprise gamma $MnO_2$ having filamentary protrusions radiating outwardly from the particles, said filamentary protrusions being visible at a magnification of between about 200 and 2000 times actual size and not visible at a magnification of less than about 200 times actual size.

2. The electrochemical cell of claim 1, wherein said electrochemical cell has an anode comprising material selected from the group consisting of lithium and zinc.

3. The electrochemical cell of claim 1 wherein said $MnO_2$ material comprises at least 95% gamma $MnO_2$.

4. The electrochemical cell of claim 1 wherein the filamentary protrusions are substantially uniformly distributed over the surface of said particles and the filamentary protrusions have a length to width ratio between about 2:1 and 20:1.

5. An electrode for an electrochemical cell comprising $MnO_2$ particles comprising at least 95% gamma $MnO_2$ having filamentary protrusions of $MnO_2$ radiating outwardly from the surface of said particles, said filamentary protrusions being visible at a magnification of between about 200 and 2000 times actual size and not visible at a magnification of less than about 200 times actual size.

6. The electrochemical cell of claim 2 wherein the anode comprises lithium and said cell further comprises a non-aqueous electrolyte.

7. An electrochemical cell having $MnO_2$ cathode active material in said cell, wherein the $MnO_2$ material comprises at least 95% gamma $MnO_2$ particles the surfaces of which have filamentary protrusions radiating outwardly therefrom, said filamentary protrusions being visible at a magnification between about 200 and 2000 times actual size and not visible at a magnification of less than about 200 times actual size.

8. An electrochemical cell having anode active material, a cathode active material and electrolyte in said cell, said cathode active material comprising a hybrid $MnO_2$ material comprising gamma $MnO_2$ on the surface of particles of electrolytic manganese dioxide (EMD), said hybrid $MnO_2$ material having filamentary protrusions of $MnO_2$ radiating outwardly therefrom, said filamentary protrusions being visible at a magnification of between about 200 and 2000 times actual size and not visible at a magnification of less than about 200 times actual size.

9. The electrochemical cell of claim 8 wherein said electrochemical cell has an anode active material comprising lithium.

10. The electrochemical cell of claim 8 wherein said electrochemical cell has an anode active material comprising zinc.

11. The electrochemical cell of claim 8 wherein said electrochemical cell is an alkaline cell.

12. An electrochemical cell having anode active material, a cathode active material and electrolyte in said cell, said cathode active material comprising a hybrid $MnO_2$ material comprising gamma $MnO_2$ on the surface of particles comprising carbonaceous material, said hybrid $MnO_2$ material having filamentary protrusions of MnO$_2$ radiating outwardly therefrom, said filamentary protrusions being visible at a magnification of between about 200 and 2000 times actual size and not visible at a magnification of less than about 200 times actual size.

13. The electrochemical cell of claim 12 wherein the anode active material comprises lithium.

14. The electrochemical cell of claim 12 wherein the anode active material comprises zinc.

15. The electrochemical cell of claim 12 wherein said electrochemical cell is an alkaline cell.

* * * * *